US012608085B1

(12) United States Patent
Zeender et al.

(10) Patent No.: US 12,608,085 B1
(45) Date of Patent: Apr. 21, 2026

(54) MAGNETIC ACTUATION FOR IMPACT-BASED FEEDBACK EFFECTS IN A KEY STRUCTURE

(71) Applicant: Logitech Europe S.A., Lausanne (CH)

(72) Inventors: Léo Zeender, Lausanne (CH); Frédéric Alexis Guillaume de Goumoëns, Morges (CH); Nuno Miguel Pereira Dos Anjos Valverde, Vaud (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 19/011,942

(22) Filed: Jan. 7, 2025

(51) Int. Cl.
| | |
|---|---|
| *G06F 3/01* | (2006.01) |
| *G06F 3/02* | (2006.01) |
| *G06F 3/0354* | (2013.01) |
| *H01H 13/85* | (2006.01) |

(52) U.S. Cl.
CPC ............ G06F 3/016 (2013.01); G06F 3/0202 (2013.01); G06F 3/03543 (2013.01); *H01H 13/85* (2013.01); *H01H 2215/03* (2013.01)

(58) Field of Classification Search
CPC .... G06F 3/016; G06F 3/0202; G06F 3/03543; H01H 13/85; H01H 2215/03
See application file for complete search history.

(56) References Cited

U.S. PATENT DOCUMENTS

| | | | | |
|---|---|---|---|---|
| 5,879,088 A * | 3/1999 | English | ................ | G06F 3/0202 |
| | | | | 200/306 |
| 11,307,663 B1 * | 4/2022 | Beyhs | .................. | G06F 3/0338 |
| 2005/0248579 A1 * | 11/2005 | Sadowsky | ........... | G06F 12/0215 |
| | | | | 711/E12.051 |

* cited by examiner

*Primary Examiner* — Ariel A Balaoing

(74) *Attorney, Agent, or Firm* — Kilpatrick Townsend & Stockton LLP

(57) ABSTRACT

A keyswitch for a keyed device, the keyswitch comprising: a housing with an inner structure defining a cavity within; a plunger protruding from a top side of the housing and extending into the cavity, the plunger operable to be depressed and travel along a linear range of motion within the cavity of the housing; a slug comprised of magnetic material and configured at a bottom section of the cavity; and a conductive coil, wherein the conductive coil is operable to generate a magnetic field in response to receiving an electrical current, the magnetic field operable to magnetically move the slug within the cavity causing the slug to impact a portion of the housing or the plunger, wherein the impact causes a feedback effect that mechanically translates through the keyswitch.

20 Claims, 9 Drawing Sheets

Magnet and Coil Inside Switch 700
710
730
720
740
750

PLUNGER
MOVING UP/DOWN

COIL
ON HORIZONTAL PCB

MAGNET
"JUMPING UP"

SMART SWITCH - Magnet Inside and Coil outside switch

Coil PCB in main PCB with donut magnet

Coil PCB under PCB with cylinder magnet version

Copper winding Coil with cylinder magnet version

Coil PCB Soldered to main PCB with cylinder magnet version

Magnet and Coil Inside Switch

FIG. 7

MAGNETIC ACTUATION FOR IMPACT-BASED FEEDBACK EFFECTS IN A KEY STRUCTURE

BACKGROUND

Haptic effects in computer peripheral devices can provide a physical feedback to a user to indicate that a certain event has occurred. For instance, keyboards may incorporate mechanical biasing structures that trigger when the key is pressed by a threshold amount, giving a tactile and "clicky" feedback profile. Some common key structures with various mechanical feedback profiles include MX Cherry type key switches. These types of key switches can afford an excellent user experience (UX) with good reliability.

Contemporary adjustable key switches can provide a user with configuration options, but are not typically adjustable, and those that are adjustable have significant limitations in application and variation. Key structures with better customizable features are needed.

BRIEF SUMMARY

In some embodiments, a keyswitch for a keyed device comprises: a housing with an inner structure defining a cavity within; a plunger protruding from a top side of the housing and extending into the cavity, the plunger operable to be depressed and travel along a linear range of motion within the cavity of the housing; a slug comprised of magnetic material and configured at a bottom section of the cavity; and a conductive coil, wherein the conductive coil is operable to generate a magnetic field in response to receiving an electrical current, the magnetic field operable to magnetically move the slug within the cavity causing the slug to impact a portion of the housing or the plunger, wherein the impact causes a feedback effect that is mechanically transferred through the keyswitch. Movement can include, for example, magnetic attraction and repulsion. In some embodiments, a sensor(s) is configured to detect a position of the plunger along the range of motion, wherein the conductive coil receives the electrical current and generates the magnetic field based on the position of the plunger along the range of motion. The generated magnetic field can control an acceleration and velocity of the movement of the slug, thereby affecting impact characteristics (e.g., how hard the impact is, linear movement, oscillating movement, etc.) of the slug against the portion of the housing or the plunger. In some aspects, the conductive coil generates the magnetic field and moves the slug when the plunger reaches a first threshold position along the range of motion, and the conductive coil generates the magnetic field and moves the slug when the plunger reaches a second threshold position along the range of motion that is different than the first position. Some embodiments may include one, two, three, or more threshold positions, which may be fixed or dynamically set (e.g., rapid trigger, as described in the detailed description below). In some embodiments, the conductive coil generates the magnetic field and moves the slug when the plunger reaches a first threshold position along the range of motion, wherein the first threshold position changes based on where the plunger is pressed and released along the range of motion. In some cases, the conductive coil is integrated on one of a printed circuit board (PCB), a flexible substrate, the keyswitch housing via in-mold electronics integration, mechatronic integrated devices technologies, or multi-material additive manufacturing processes. In some embodiments, the slug and conductive coil are configured outside of the housing, the slug is configured inside of the housing and the conductive coil is configured outside of the housing, the slug and conductive coil are configured inside of the housing, or any suitable arrangement per design specifications. In some aspects, the keyed device is a keyboard or a computer mouse where the plunger is coupled to a keyplate. In some implementations, the impact causes an impact-based feedback effect that mechanically translates through the keyswitch to a top portion of the plunger (e.g., a coupled user-accessible keycap).

In some embodiments, a method of operating a keyswitch comprises: controlling a sensor configured to detect a position of a plunger operable to be depressed and travel along a range of motion within a cavity of a keyswitch housing; determining when the plunger reaches a threshold position along the range of motion; and driving a conductive coil with an electrical current in response to the plunger reaching the threshold position, the conductive coil operable to generate a magnetic field based on the electrical current, wherein the magnetic field magnetically moves a magnetic element, causing the magnetic element to impact a portion of the keyswitch housing or the plunger, and wherein the impact causes a feedback effect that mechanically translates through the keyswitch. In some embodiments, the generated magnetic field controls an acceleration and velocity of the movement of the magnetic element, thereby affecting impact characteristics of the magnetic element against the portion of the housing or the plunger. The method, in further embodiments, includes driving the conductive coil with a second electrical current in response to the plunger reaching a second threshold position, the second electrical current causing the conductive coil to generate a second magnetic field that moves the magnetic element causing the magnetic element to impact the portion of the keyswitch housing or the plunger. Some embodiments may include one, two, three, or more threshold positions, which may be fixed or dynamically set (e.g., rapid trigger, as described below). In some aspects, the magnetic element and conductive coil are configured outside of the keyswitch housing, the magnetic element is configured inside of the keyswitch housing and the conductive coil is configured outside of the keyswitch housing, or the magnetic element and conductive coil are configured inside of the keyswitch housing. In some cases, the keyswitch operates on a keyboard. In some cases, the plunger is coupled to a user accessible keyplate of a computer mouse. The keyswitch may be implemented on any suitable device and can include both linear mechanical devices (e.g., a plunger) or rotary devices (e.g., scroll wheel). One of ordinary skill in the art with the benefit of this disclosure would appreciate the many modifications, variations, and alternative embodiments thereof.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 7 shows a smart keyswitch structure 700 that utilizes magnetic actuation for impact-based feedback effects, according to certain embodiments;

Throughout the drawings, it should be noted that like reference numbers are typically used to depict the same or similar elements, features, and structures.

DETAILED DESCRIPTION

Figure 1:
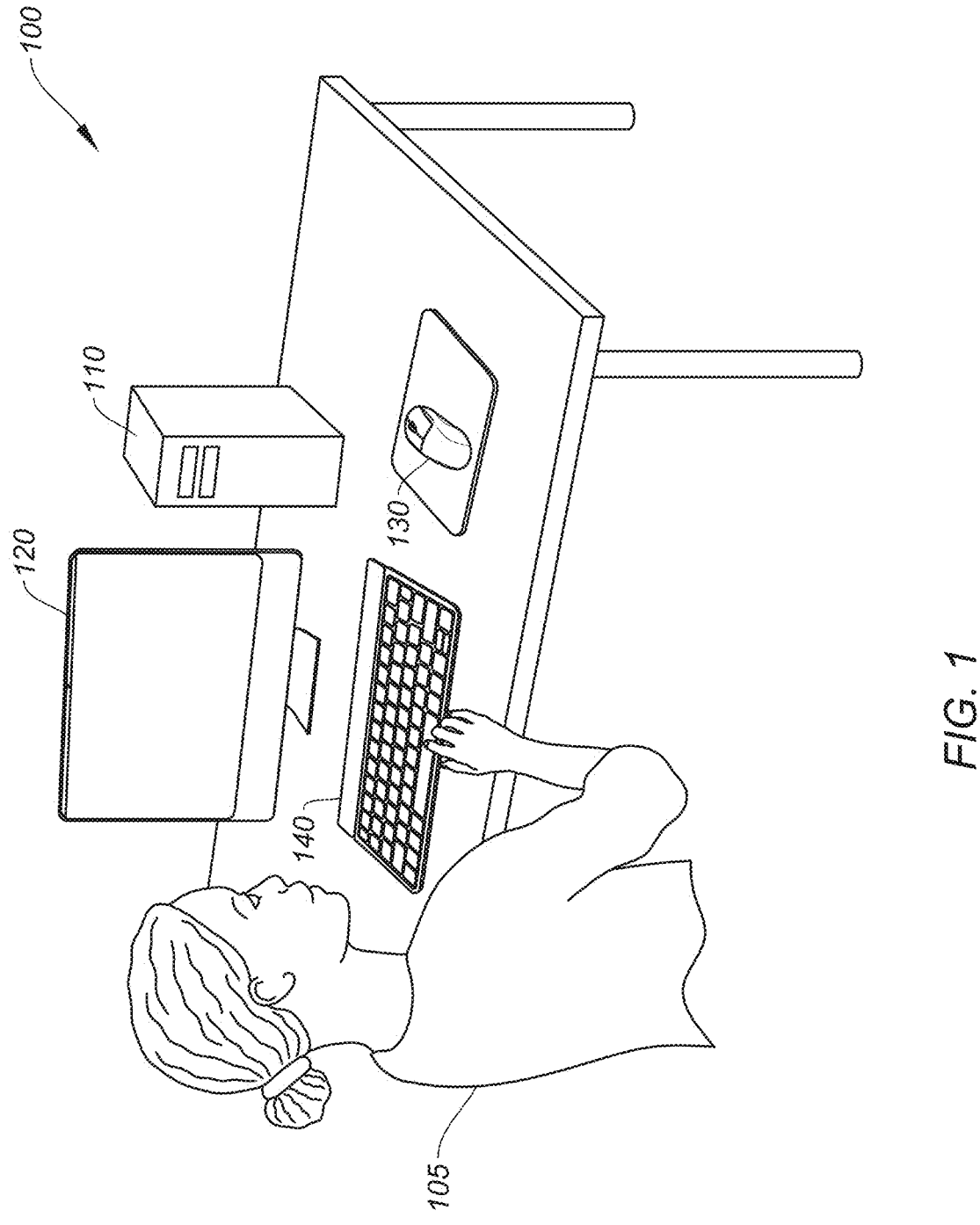
FIG. 1 shows a simplified example of a computer system that can include any of a variety of host computing devices and computer peripheral devices, including those that can be configured to perform aspects of the various inventive concepts described herein.

Aspects of the present disclosure relate generally to computer peripheral devices, and more particularly to key structures with impact-based feedback systems, according to certain embodiments.

In the following description, various examples of key structures with magnet-controlled, impact-based feedback systems are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to magnetic actuation to generate feedback effects in a keyswitch. The feedback effects can simulate the tactile and clicky feedback effects found in conventional keyswitches typically caused by a movement of a biasing mechanism (e.g., spring) against a protrusion, causing a physical impact and often an audible click sound that users have come accustomed to. In some cases, the audible click may operate as an audible confirmation that a key press has been instantiated. The user experience (UX) provided by such switches can be very good, but often times the UX is not customizable, or the customizability can be significantly limited in terms of a type of feedback provided, or a lack of adjustment of a strength of the impact-based vibration, a threshold where impact-based feedback triggers during the key press, or other aspects, and the products that do allow some customizability often require physical changes in hardware or other cumbersome and/or expensive modifications.

Some embodiments of the present disclosure can utilize magnetic-controlled actuation to provide an impact-type feedback (as opposed to a typical vibration-type feedback of conventional haptic devices) to a user in a highly customizable manner. In some embodiments, electromagnetic mechanical actuations are used to generate impact feedback to a user. Feedback and actuation can be modulated including UX customization through defining an intensity and variation of a magnetic field, leading to different accelerations and acceleration directions of a magneto mechanical element (e.g., a magnet). In terms of feedback, aspects of the invention are capable of generating impulse type feedback as well as repeated impulses, including varying continuous impulses, such as clicks, typing, and other types of UX feedback for any suitable keyed device, such as keyboards, computer mice, gaming device, or other computer peripheral device. In some embodiments, the feedback can be provided at different levels of intensity for specific tactile and acoustic cues, within the range afforded between a linear and a very clicky feedback. Additionally, the feedback can be provided discretely, a single impulse upon a user press; or software induced impulse, either single or continuous/repeated feedback even without user interaction (e.g., a notification).

Figures 4A, 4B:
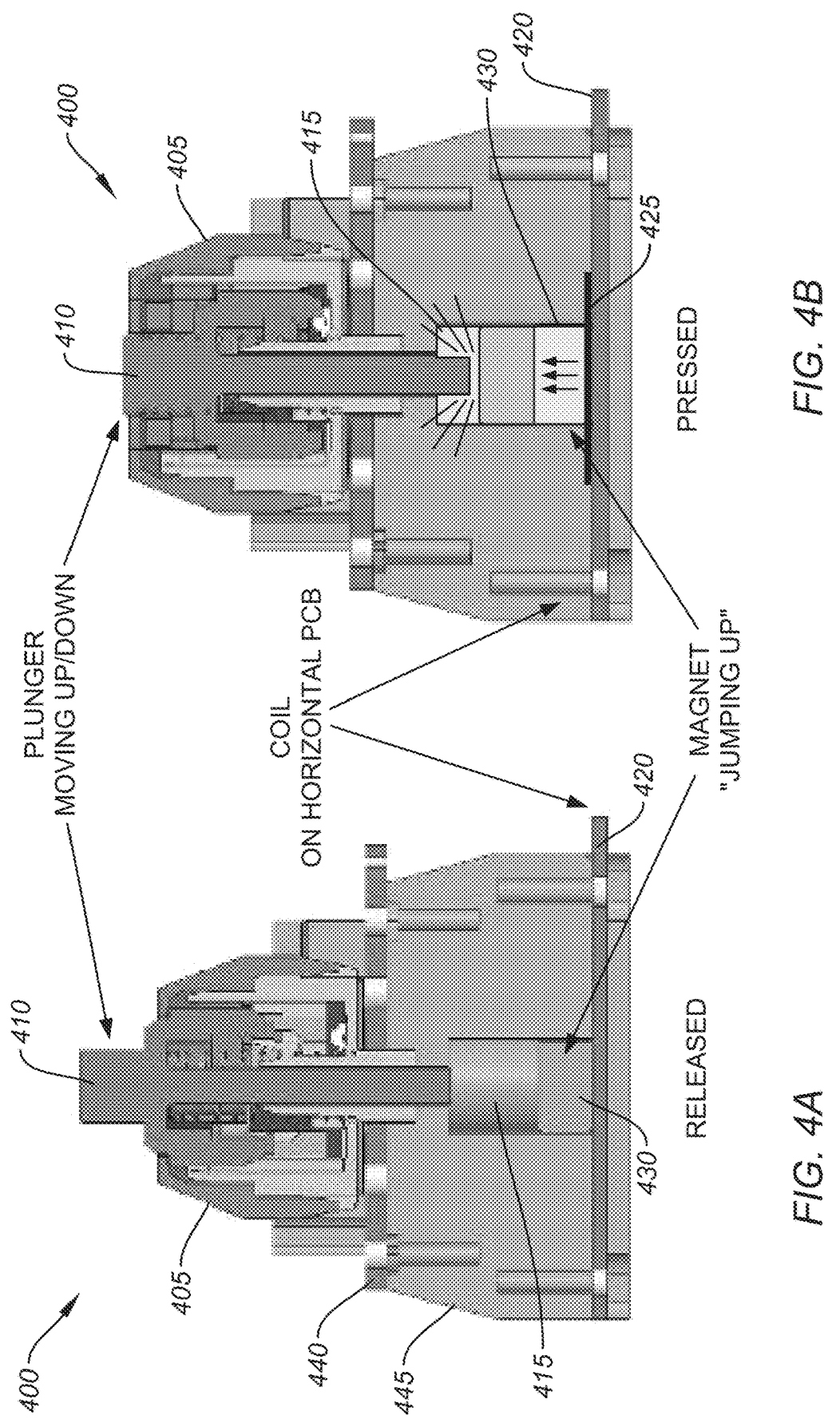
FIGS. 4A and 4B show a smart keyswitch structure 400 that utilizes magnetic actuation for impact-based feedback effects, according to certain embodiments.

In some implementations, a keyswitch for a keyed device, such as those shown in FIGS. 4A-4B) can include a housing with an inner structure defining a cavity within; a plunger protruding from a top side of the housing and extending into the cavity, the plunger operable to be depressed and travel along a linear range of motion within the cavity of the housing; a slug comprised of a moving magnetic element, magnet, a ferrous material, a secondary coil, or a combination thereof, to which any protective, encapsulating and/or damping materials could be added, typically configured at a bottom section of the cavity; and a conductive coil. The conductive coil can be operable to generate a magnetic field in response to receiving an electrical current, the magnetic field operable to magnetically repel and deflect the slug up within the cavity causing the slug to impact a portion of the housing or the plunger. The impact can mechanically translate through the keyswitch, e.g., through to the top of a plunger and to the user. A sensor (e.g., inside the housing) can detect a position of the plunger along the range of motion, and the magnetic field can be modulated based on the position of the plunger along the range of motion. The modulation of the magnetic field can control the acceleration and velocity of the deflection of the slug against the portion of the housing or the plunger. In some embodiments, the magnetic field may be generated in response to the plunger reaching one or more threshold positions along the range of motion. For instance, when a plunger is depressed to a first position, a first magnetic field and subsequent impact-based feedback may be generated, and when the plunger continues along the range of motion to a second position, a second magnetic field and subsequent impact-based feedback, which may be different, can be generated. More threshold positions are possible and different feedback effects can be generated based on, for example, the acceleration and velocity of the slug, a polarity of the magnetic field, and an intensity of the magnetic field. The slug can generate perceivable feedback to a user by impact with surrounding structures, such as a plunger, keyboard keycap, mouse keyboard, housing feature, device shell, or the like. FIGS. 4A-7 show various embodiments of keyswitches using magnetic actuation for feedback effects.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1 shows a simplified example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 can include computer 110, monitor 120, computer mouse 130, and keyboard 140. In some cases, keyboard 140 can be a "qwerty" style keyboard, or any suitable input device (e.g., internet-of-things device, AR/VR controller, remote controller, or the like) with one or more keys that can be configured as analog keys with travel and force detection, as further described throughout this disclosure. For computer system 100, keyboard 140 can be configured to control various aspects of computer 110 and monitor 120, as would be appreciated by one of ordinary skill in the art with the benefit of this disclosure. The monitor 120, computer mouse 130, and keyboard 140 may be referred to generally as "computer peripheral devices" or "input devices." Computer peripheral devices 120-140 can be communicatively coupled to host computing device 110 and, in some cases, may be coupled to multiple host computing devices. Although many of the examples presented herein utilize analog keys in a keyboard-type computer peripheral device, it would be understood by those of ordinary skill in the art with the benefit of this disclosure that the usage of such structures can be applied to other types of input devices.

Computer 110 can be any suitable computing device including, but not limited to, a desktop computer, a laptop computer, a tablet or "phablet" computer, a smartphone, a PDA, a wearable device (e.g., smart watches, smart glasses), virtual reality/augmented reality (VR/AR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor(s) 210 of FIG. 2) to control aspects of the host computing device, for instance, via the one or more computer peripheral devices.

Figure 2:
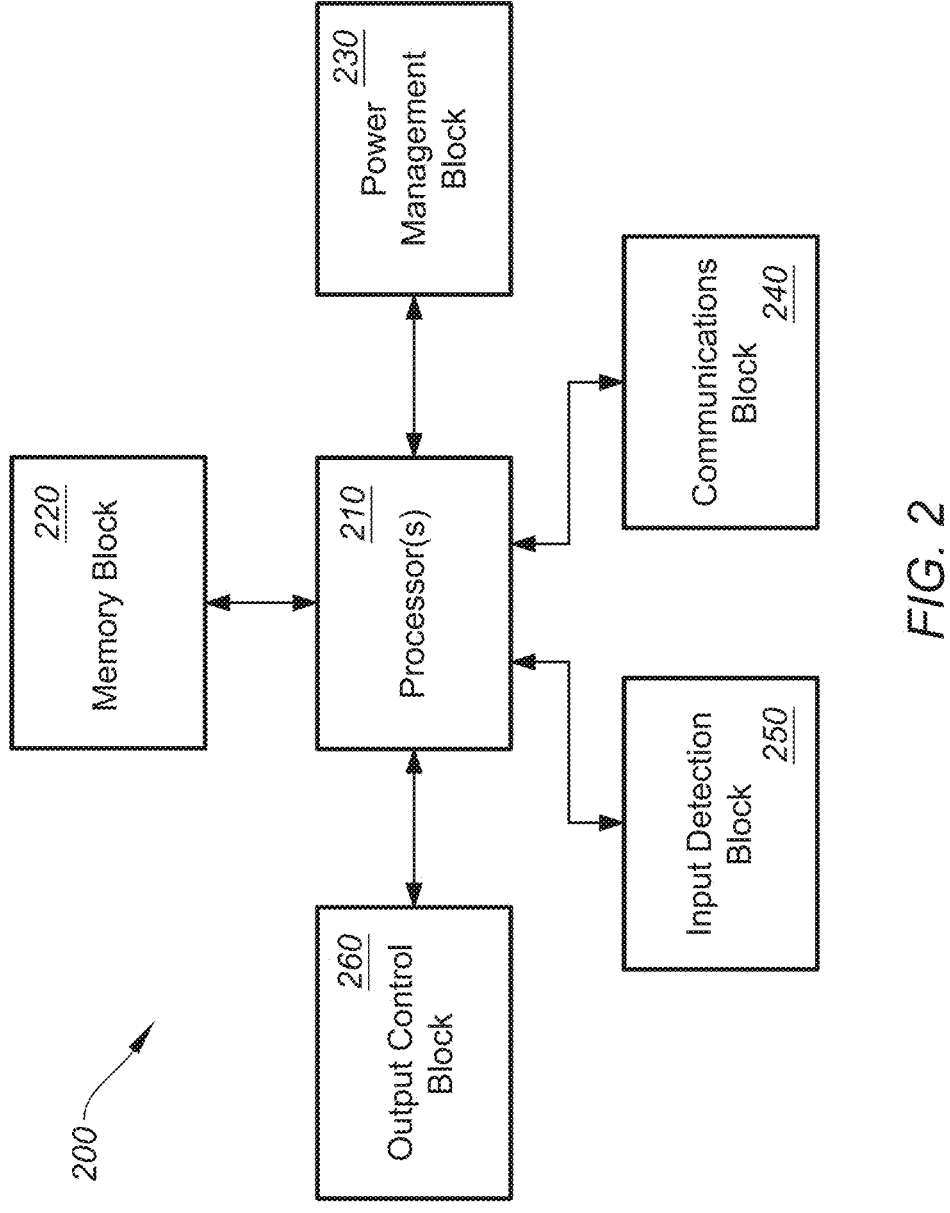
FIG. 2 shows a system 200 for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, a memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate blocks, or alternatively, more than one system block may be implemented in a single block. In the context described herein, system 200 can be incorporated into any computer peripheral devices (e.g., input devices) described or mentioned herein and may be further configured with any of the analog key structures presented herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of keyboard 140 (e.g., system blocks 220-260). Alternatively or additionally, some of system blocks 220-260 may include an additional dedicated processor, which may work in conjunction with processor(s) 210. For instance, MCUs, uCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, Zig-Bee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor(s) 210 to perform some or all of the various methods described throughout this disclosure. In some embodiments, multiple processors may enable increased performance characteristics in system 200 (e.g., speed and bandwidth), however, multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), and/or applications stored in media storage that can be read into memory for execution by processing devices (e.g., processor(s) 210). Software can be implemented as a single program or a collection of separate programs and can be stored in non-volatile storage and copied in whole or in part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., buttons, sliders, touch-sensitive regions, etc.), or the like. Stored data may be aggregated and sent via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in part to volatile working memory during program execution. From a storage subsystem, processing devices can retrieve program instructions to execute various operations (e.g., software-controlled switches, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cables to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHZ), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys, or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor(s) 210, or in combination therewith.

In some embodiments, input detection module 250 can detect a touch or touch gesture on one or more touch sensitive surfaces on keyboard 140. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photodiodes to detect the movement of a computer peripheral device relative to an underlying surface. A computer peripheral device may optionally include movement tracking hardware that utilizes coherent (laser) light. Movement tracking can provide positional data (e.g., delta X and delta Y data from the last sampling) or lift detection data. For example, an optical sensor can detect when a user lifts the computer peripheral device (e.g., computer mouse 130) off an underlying surface (also referred to as a "work surface") and can send that data to processor(s) 210 for further processing. In some embodiments, processor(s) 210, the movement tracking block (which may include an additional dedicated processor), or a combination thereof, as would be appreciated by one of ordinary skill in the art with the benefit of this disclosure.

In certain embodiments, accelerometers can be used for movement detection.

Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation. In some embodiments, input detection block 250 can control aspects of one or more sensing elements, as described herein.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), impact-based feedback systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus subsystem to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations (e.g., by programming a processor or providing appropriate control circuitry) and various blocks might or might not be reconfigurable depending on how the initial configuration is obtained.

System 200 can be applied in whole or in part (e.g., a subset of system blocks 210-260), or with additional blocks to realize the various inventive concepts described herein. In some cases, multiple systems 200 or portions thereof can be applied to a computer peripheral device.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other subsystems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to apply to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
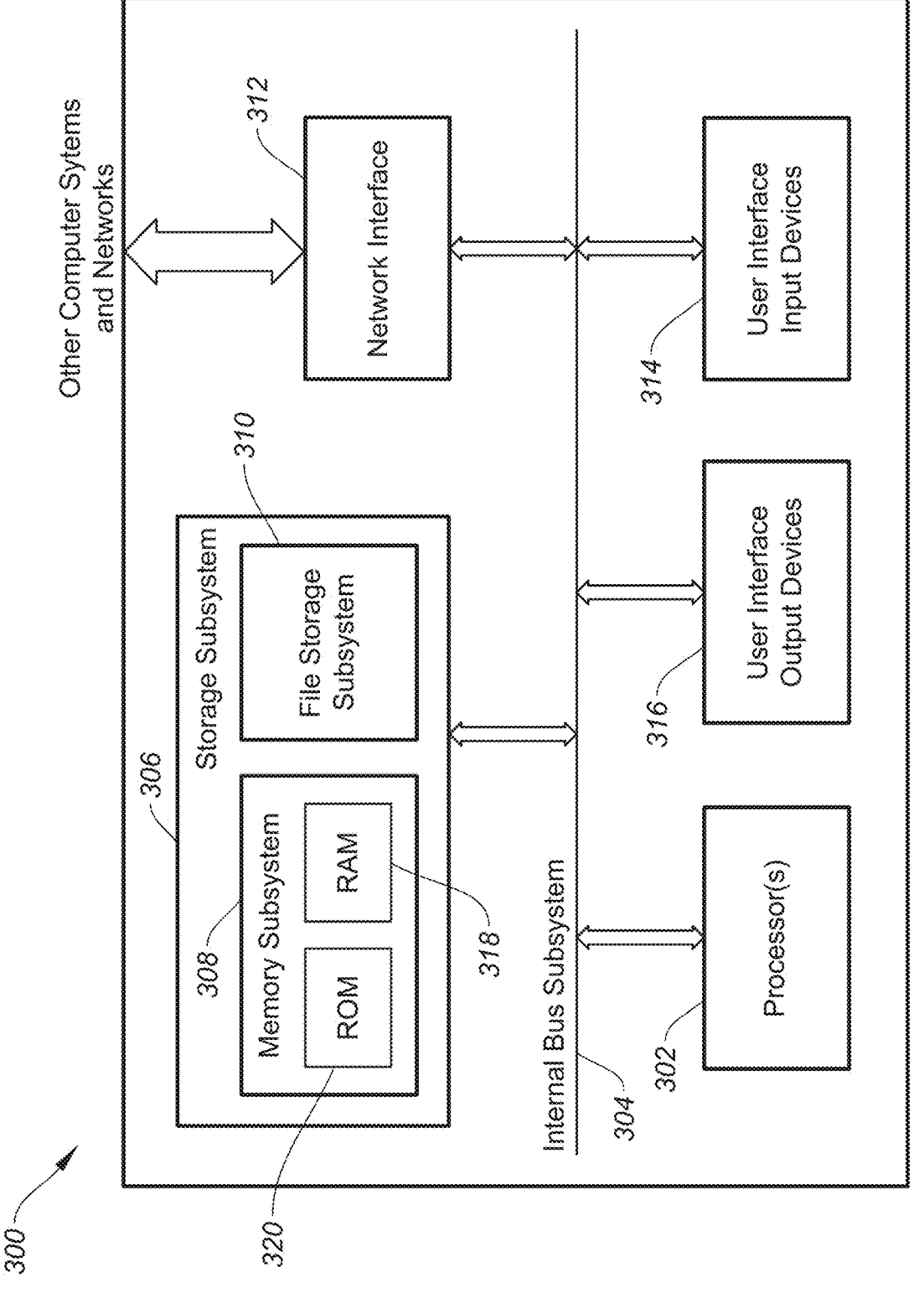
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed-up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing the methodologies described herein. Code modules (e.g., instructions stored in memory) may be implemented within a processor or external to the processor. As used herein, the term "memory" refers to a type of long term, short term, volatile, nonvolatile, or other storage medium, and is not to be limited to any particular type of memory or number of memories, or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps, and means described throughout the present disclosure may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special-purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), etc. Note that user interface input and output devices are shown to be a part of system 300 as an integrated system. In some cases, such as in laptop computers, this may be the case as keyboards and input elements as well as display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations (e.g., by programming a processor or providing appropriate control circuitry) and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Magnetic Actuation for Impact-Based Feedback Effects

Aspects of the invention relate to magnetic actuation to generate impact-based feedback effects in a keyswitch. The impact-based effects can simulate the tactile and clicky feedback effects found in conventional keyswitches typically caused by a movement of a biasing mechanism (e.g., spring) against a protrusion, causing a physical impact and often an audible click sound that users have come accustomed to. In some cases, the audible click may operate as an audible confirmation that a key press has been instantiated. The user experience (UX) provided by such switches can be very good, but often times the UX is not customizable, or the customizability can be significantly limited in terms of a type of feedback provided, or a lack of adjustment of a strength of impact, a threshold where impact occurs in the key press, or other aspects, and the products that do allow some customizability often require physical changes in hardware or other cumbersome and/or expensive modifications.

Some embodiments of the present disclosure can utilize magnet-controlled actuation to provide feedback to a user in a highly customizable manner. In some embodiments, electromagnetic mechanical actuations are used to generate impact-based feedback to a user. Feedback and actuation can be modulated including UX customization through defining an intensity and variation of a magnetic field, leading to different accelerations and acceleration directions of a magneto mechanical element (e.g., a magnet). In terms of feedback, aspects of the invention are capable of generating impulse type feedback as well as repeated impulses, including varying continuous impulses, such as clicks, typing, and other types of UX feedback for any suitable keyed device, such as keyboards, computer mice, gaming device, or other computer peripheral device.

FIGS. 4A and 4B show a smart keyswitch structure 400 that utilizes magnetic actuation for impact-based feedback effects, according to certain embodiments. Smart keyswitch structure ("keyswitch") 400 can provide a click feedback for make/brake events like for a linear switch. For example, rather than a conventional haptic effect when a biasing mechanism interfaces with a protrusion, keyswitch 400 can create a feedback effect at any point along the range of motion of the key press, including multiple points, which can also differ on the key press as compared to the key release. The feedback effects can include tactile, clicky, and linear feedback profiles, or other suitable feedback profile. In some cases, force click feedback and rapid trigger feedback is made possible with smart keyswitch 400.

Smart keyswitch structure 400 can include a housing 405, plunger 410, a printed circuit board (PCB) 420, conductive coil 425, and slug 430. Housing 405 includes a cavity 415 or is coupled to an inner structure 445 ("structure") defining a cavity 415. Cavity 415 can be a channel, cylindrical, square, rectangular, or any suitable polygonal shape. Cavity 415 can have a uniform dimensions or can be a compound set of dimensions (e.g., wider adjacent to the plunger range of motion and narrower adjacent to the slug's range of movement. It is to be understood that the term "cavity" is an umbrella term defining a opening within the housing and a wide range of cavity dimensions are possible as would be appreciated by one of ordinary skill in the art with the benefit of this disclosure. In some cases, housing 405 may include the cavity, or the housing may be coupled to another structure 445 (e.g., via PCB 440) that contains the cavity and/or slug 430, as shown.

Plunger 410 can be configured such that it protrudes from a top side of the housing and extends into the cavity. In some aspects, a top of the plunger can be coupled to a user-accessible keycap. When a user presses the keycap, the plunger is operable to be depressed and travel along a range of motion (e.g., downward linear motion) within the cavity of structure 445, as shown between the transition between FIGS. 4A-4B. Slug 430 can be a magnet or comprised of other ferrous material, as well as a coil or any combination thereof. Typically, slug 430 is a monolithic element, however some embodiments may include a compound element (e.g., ferrous material(s) to react to the magnetic field and non-ferrous materials that may have certain desired impact characteristics (e.g., vibroacoustic damping) or reduced friction to movement inside cavity 415. In combination with the design of the coil and its induced magnetic field, the size/mass/inertia of the slug can be a design parameter that can be used to define the range of feedback intensity and UX features provided by the system. The cavity 415 that the plunger and slug move within can be a single cavity (e.g., cylindrical) of uniform dimensions, compound dimensions (e.g., different diameters at different locations within housing 405), or the like.

Conductive coil 425 can be a single coil or multiple coils connected in series, in parallel, or a combination thereof. Conductive coil 425 can be configured on a plane or extend in three dimensions. In certain embodiments, conductive coil 425 is integrated on PCB 420 and can be driven by one or more processors (210) and/or driver circuits to cause an electrical current to pass through conductive coil 425 and generate a magnetic field. In some configurations, the magnetic field is operable to magnetically repel and deflect the slug up within the cavity at an acceleration and velocity based on characteristics (e.g., strength, duration, range) of the magnetic field. The slug can thus impact a bottom of the plunger or a portion of the housing (e.g., internal flange that extends into the cavity) at varying speeds, frequencies, and in response to the plunger reaching different threshold positions over its range of motion. For instance, a greater current through conductive coil 425 can produce a magnetic field that may magnetically repel slug 430 at an increased acceleration and velocity as compared to a lower current. In some typical systems with slug-based designs, power can vary between 0.1 W to 10 W with slugs weighting between 0.1 gr to 10 gr, and force ranging from 30 gf to 300 gf, although other amounts are possible. In some cases, an alternative current may be used to create a varying magnetic field that may cause slug 430 repeatedly accelerate and decelerate to periodically (or aperiodically) change direction to rapidly and successively impact the plunger or housing to generate a controllable impact-based vibration effect. In some embodiments, a sensor (not shown) may be configured to detect a position of the plunger within the cavity where one, two, three, or more different threshold positions can be used to trigger a feedback effect, which can be similar or may differ with each threshold position. For example, each threshold position may correspond to a different current signal driving the conductive coil 425. One of ordinary skill in the art with the benefit of this disclosure would appreciate the many modifications, variations, and alternative embodiments thereof.

Referring to FIG. 4A, smart keyswitch 400 is in a non-pressed state with plunger 410 in a neutral position (e.g., top-most position, unpressed position). Slug 430 is at rest at a bottom portion of cavity 415 because conductive coil 425 is either not generating a magnetic field, not generating a magnetic field that repels slug 430 (e.g., the magnetic field attracts slug 430), or is not generating a magnetic field with enough repel force to magnetically push slug 430 up through cavity 415. Referring to FIG. 4B, plunger 410 is pressed and moves down within cavity 415. Plunger 410 is pressed to at least a first threshold position, causing the driving circuit (e.g., processors 210) to drive conductive coil 425 with an electrical current that causes conductive coil 425 to generate a magnetic field that magnetically repels slug 430 up through cavity 415 causing slug 430 to impact a bottom of plunger 430. The impact and its consequent vibrations are mechanically translated through the plunger 430, which is felt as a physical feedback at the top of plunger 430 and/or a coupled keycap (not shown), which can be perceived by a user when touching the keycap. Alternatively or additionally, in some cases the slug 430 can impact a portion of the housing, which may mechanically translate vibrations from the impact to the user via the key cap. In some embodiments, slug 430 and conductive coil 425 (e.g., coupled to PCB 420) can be configured outside of the switch as shown, wherein smart keyswitch 400 is mounted on a first PCB 460, and PCB 420 is configured below and coupled to PCB 460 where cavity 415 continues from housing 405 (or structure 445) into and underlying structure 470 where the slug 430 can move and impact plunger 410 during operation. In some embodiments, the switch may include the cavity (also referred to as a channel) for the slug to move, or the switch may be coupled to a structure that includes the cavity, as shown in FIGS. 4A-4B. In FIGS. 4A-4B, switch 400 is attached to a main PCB 440. PCB 440 is coupled to a structure 445 that includes cavity 415 and houses magnet 430. Structure 445 is coupled to bottom PCB 420, which includes a coil 424 configured thereon and operates as described above. In some embodiments, the conductive coil can be integrated in the system in a printed circuit board (PCB), a flexible substrate, as an integrated element (e.g., wiring), directly embedded in the key switch structure (e.g., via dual-shot material or in-mold inserted electronics) or Mechatronic Integrated Devices technologies (3D-MID), multi-material additive manufacturing processes, or other suitable methodology. One of ordinary skill in the art with the benefit of this disclosure would appreciate the many modifications, variations, and alternative embodiments thereof.

Figures 5A, 5B:
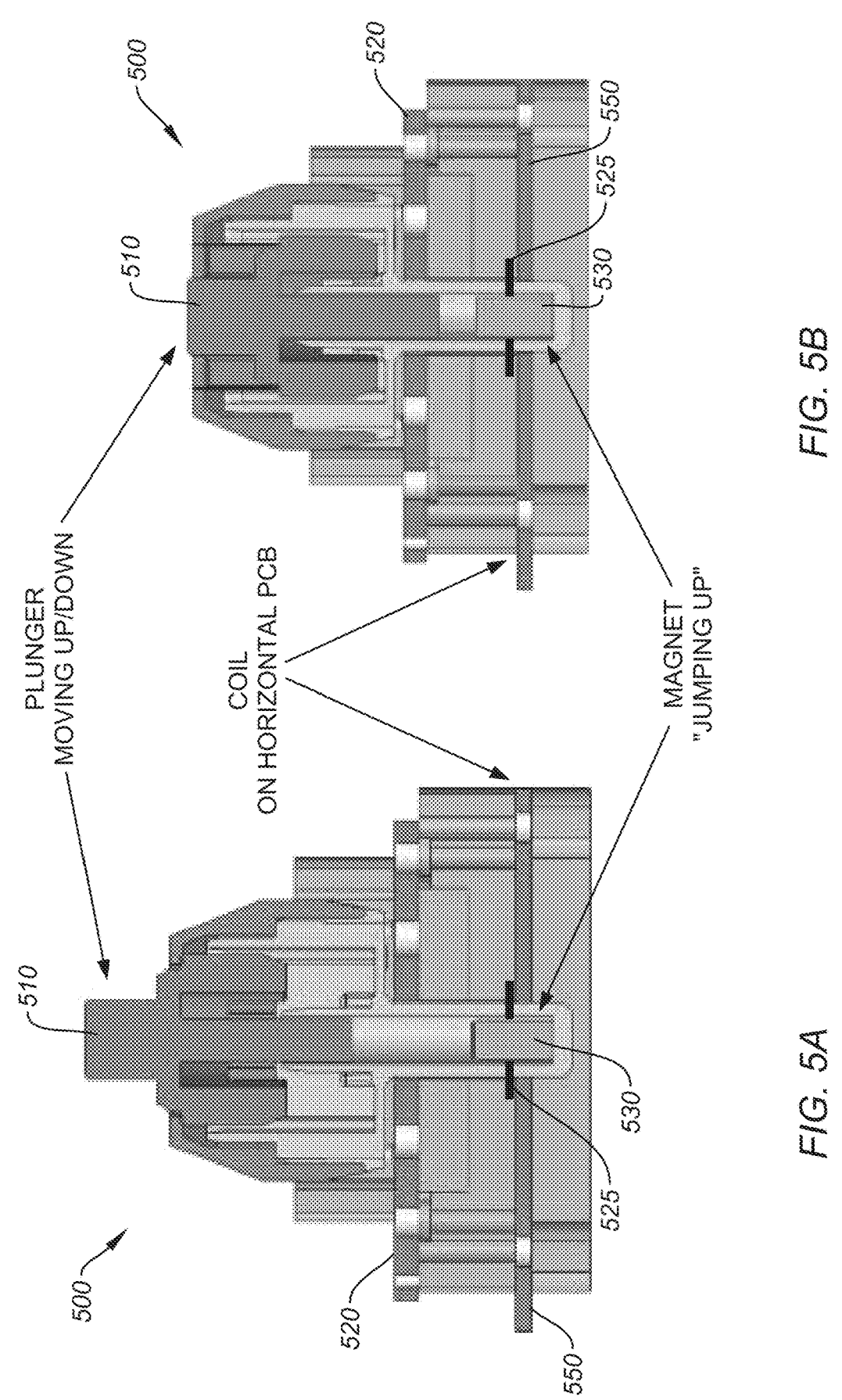
FIGS. 5A and 5B show a smart keyswitch structure 500 that utilizes magnetic actuation for impact-based feedback effects, according to certain embodiments.

FIGS. 5A and 5B show a smart keyswitch structure 500 that utilizes magnetic actuation for impact-based feedback effects, according to certain embodiments. Smart keyswitch structure 500 can include a housing 505, plunger 510, a printed circuit board (PCB) 520, conductive coil 525, and slug 530, and may be similar in operation to keyswitch structure 400, except that slug 530 may be configured inside keyswitch structure 500, while the conductive coil 525 may be configured outside keyswitch structure 500. For example, the conductive coil may be configured on another PCB 550 below key structure 500, as shown. In some cases, a conductive coil may be configured below the slug 530, however some embodiments may be configured such that, at rest, the slug 530 is configured, at least partially, on a same plane as the PCB with conductive coil 525, as shown. The embodiment of FIGS. 5A-5B shows a compact system with a smaller cavity and magnet than switch 400. Such embodiments may have excellent mechanical coupling and reduced losses (e.g., dissipating vibrations), while using less available design space.

Figures 6A, 6B, 6C, 6D:
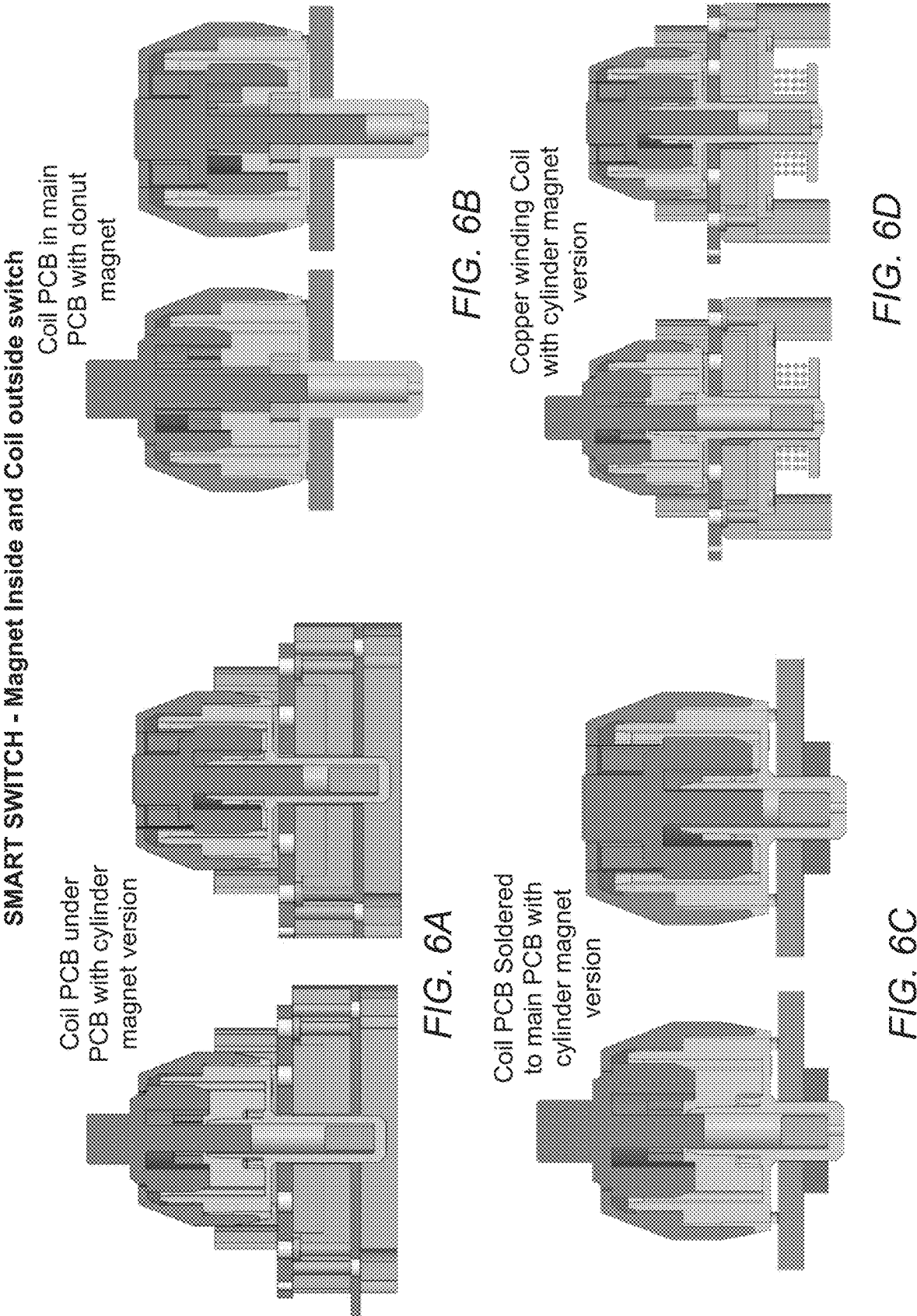
FIGS. 6A-6D show different smart keyswitch structures that utilizes magnetic actuation for impact-based feedback effects, according to certain embodiments.

FIGS. 6A-6D show different smart keyswitch structures that utilizes magnetic actuation for impact-based feedback effects, according to certain embodiments. FIG. 6A shows a coil PCB under PDB with a cylinder magnet, and is similar to the key switch of FIG. 5A, with a dedicated PCB for a coil configured in a bottom case. FIG. 6B uses a magnet with a hole in the center (e.g., "donut" or toroid magnet). A portion of the plunger can pass through the center of the magnet. In such embodiments, a coil can be coupled to or integrated with a main PCB instead of having a separate PCB, which can save costs and space. Aspects of FIG. 6C are similar to FIG. 6A with a difference in that the coil PCB can be soldered to the main PCB, which can simplify the assembly process. Aspects of FIG. 6D re similar to FIG. 6A, but for the PCB coil being replaced by a winded copper coil, which can be more sustainable.

Figure 7:
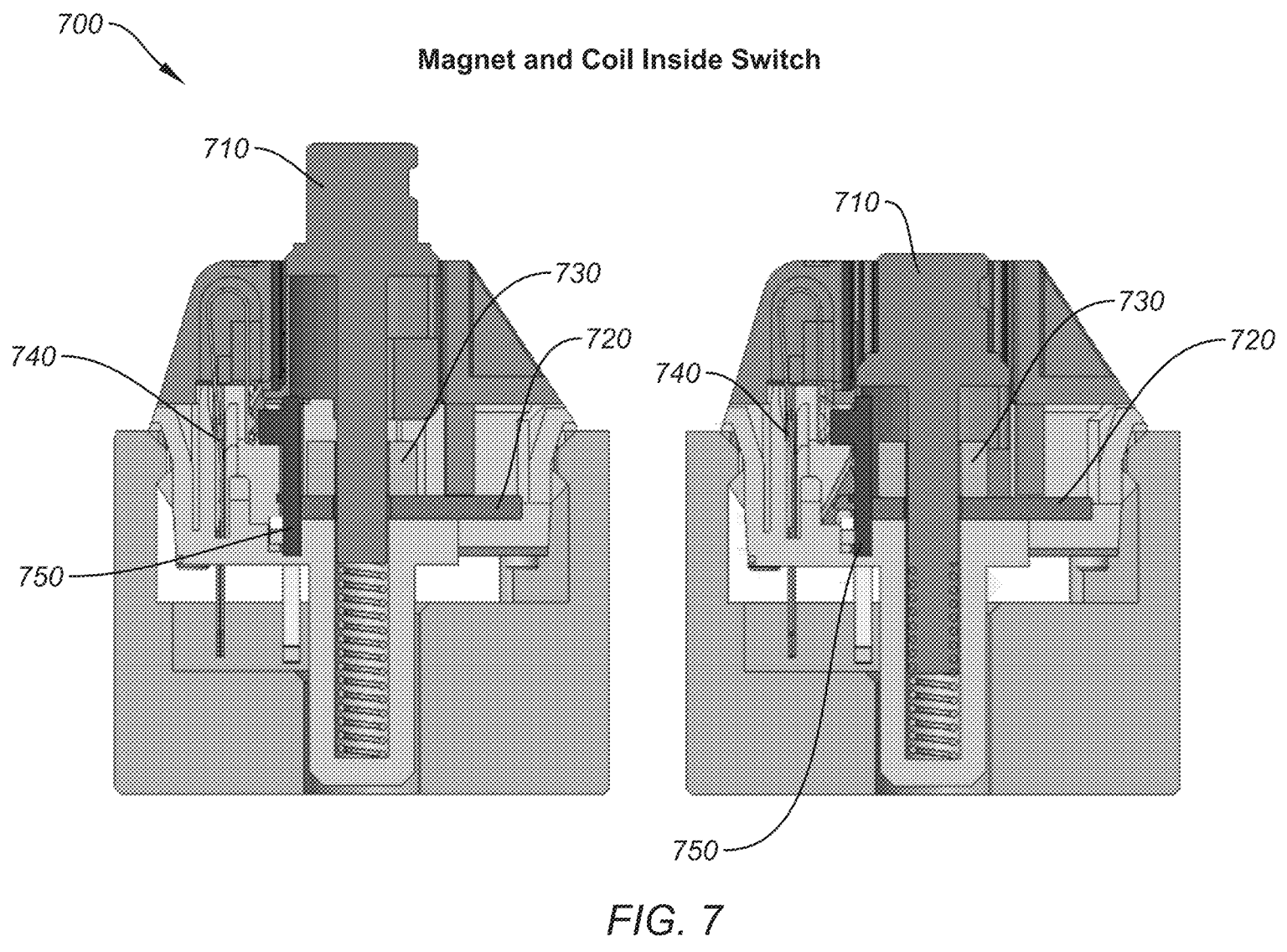

FIG. 7 shows a smart keyswitch structure 700 that utilizes actuation for impact-based feedback effects, according to certain embodiments. Smart keyswitch structure 700 can include both the slug 730 and conductive coil 720 configured therein. Smart keyswitch structure 700 can include a plunger 710, hybrid galvanic contact 740, sensor circuit on a vertically configured PCB 750, slug 730 configured within a cavity as shown, and a conductive coil 720 on a horizontally configured PCB. The horizontal conductive coil 720 can be configured inside the key switch and soldered directly to the vertical PCB. Thus, the key switch can be compatible with modular switch type designs.

Impact-Based Feedback Effects

The various embodiments described herein (e.g., as shown in FIGS. 4A-7) show different ways of effectuating an impact-based feedback effect to a user. As noted above, conventional designs often use a rotating motor with an eccentric weight configured to generate a controllable vibrational effect, or in some cases, piezoelectrical (oscillating) materials can be used. In contrast, embodiments presented herein are operable to create an impact-based feedback effect caused by a magnetically controlled propulsion of an object against a target (e.g., plunger, portion of a housing, etc.). The various embodiments of FIGS. 4-7 show an array of options for system design that can yield better specific performance for sensing and haptics, structural optimizations for minimizing mechanical losses, enabling acoustic damping and tuning, better coupling and guidance of moving parts (e.g., magnet), better use of design space, and the like, as would be appreciated by one of ordinary skill in the art with the benefit of this disclosure.

One or more threshold positions of the plunger can be used to trigger an impact-based feedback effect. For example, three threshold positions (e.g., different locations along the plunger range of motion) can be operable to cause an impact-based feedback effect. The feedback effect can be the same in response to the traversal of each threshold position, or different feedback effects can be applied in response to traversing each threshold position. For example, a light-impact feedback effect may apply to a first threshold position, a heavy-impact feedback effect may apply to a second threshold position, and an impact-based vibrational effect may apply to a third threshold position. In some cases, an impact-based feedback effect may occur when the plunger passes through the threshold position from above the threshold position (moving down) or from below the threshold position (moving up). Alternatively, a hysteresis may be applied where the threshold position is different for when the plunger is moving up or moving down.

Alternatively or additionally, an impact-based feedback effect may be applied when the plunger moves at a particular threshold velocity or acceleration. For instance, if a user presses the plunger very quickly (e.g., faster than a threshold velocity), an impact-based feedback effect may differ in that case than if the user pressed the plunger slowly (e.g., slower than the threshold velocity).

In some embodiments, any of threshold detecting positions can be adjusted. This can be done by user input (e.g., via software (SW), firmware (FW), or a combination thereof), enabling customization of the required travel to actuate the first and consequent levels of input. Such embodiments allow the user to actuate the key at a preferred range (e.g., very shallow with low travel input for a more responsive control; or a longer travel to prevent miss actuations). Furthermore, the adjustment can be shared across multiple keys or done individually for each of the input systems, allowing individualization across the layout of a keyed device.

The adjustment of the detection thresholds can also be achieved by SW/FW without user input. This allows for adjusting the sensing thresholds to better match user intentions, by the use of machine-learning algorithms or any similar adaptive algorithms, in order to prevent undesired actuations or to optimize the system for a faster response. Similarly, along with the analog sensing input, such systems can detect the intention of clicking before the clicking threshold is achieved during keyplate travel. By measuring a set of input parameters, including velocity and acceleration, the system can confirm the intention of input from the user and actuate the system, including modulating the magnetic field and generating the feedback before the key physically reaches the threshold. This adaptive feature reduces system lag and enables a faster input-feedback response, in an order of milliseconds. That is, an inherent delay caused by a motion of a potentially "heavy" magnet and corresponding inertia (on the order of ~ 10 ms) can be reduced and the user can get the feedback precisely when the plunger/sensing crosses a specific threshold.

The adjustment of sensing thresholds can also be performed at end-of-line production and qualification, self-calibrating the device to perform, both in sensing and feedback generation (e.g., intensity) at the same input displacement, minimizing the influence of electro-magneto-mechanical deviations originating from any of the individual elements as their assembly in the system.

In some cases, a "rapid trigger" feedback effect may be implemented using the impact-based feedback systems described herein. Rapid trigger functionality is typically described as a detected press and release of a key, typically beyond a threshold position, even if the press and release occurs mid-throw over a small portion of the total plunger range of motion. In other words, rapid trigger can instantly activate a key press (make contact) at a threshold position and instantly deactivate the key press (break contact) at the onset of the release, regardless of where that occurs. Rapid trigger can eliminate all or nearly all latency caused by physical movement of the switch by dynamically activating and deactivating the key based on travel distance instead of a fixed point in the key travel. This also means you can repeat a key press mid motion without needing to surpass a fixed reset or actuation point for rapid presses. You can customize Rapid trigger to be as sensitive as 0.1 mm or less. Thus, a user could push a plunger past a "make" threshold and repeatedly release and press along the range of motion past the threshold point and over a small range of motion (+/−0.5 mm) and rapidly effectuate make and break events without having to completely release the key past the threshold to effectuate another make event. Aspects of the invention can utilize magnetic actuation for impact-based feedback effects (see e.g., FIGS. 4A-7) to coincide with each make or break event in any suitable manner as described herein.

Figures 8A, 8B, 8C, 8D, 8E, 8F, 8G:
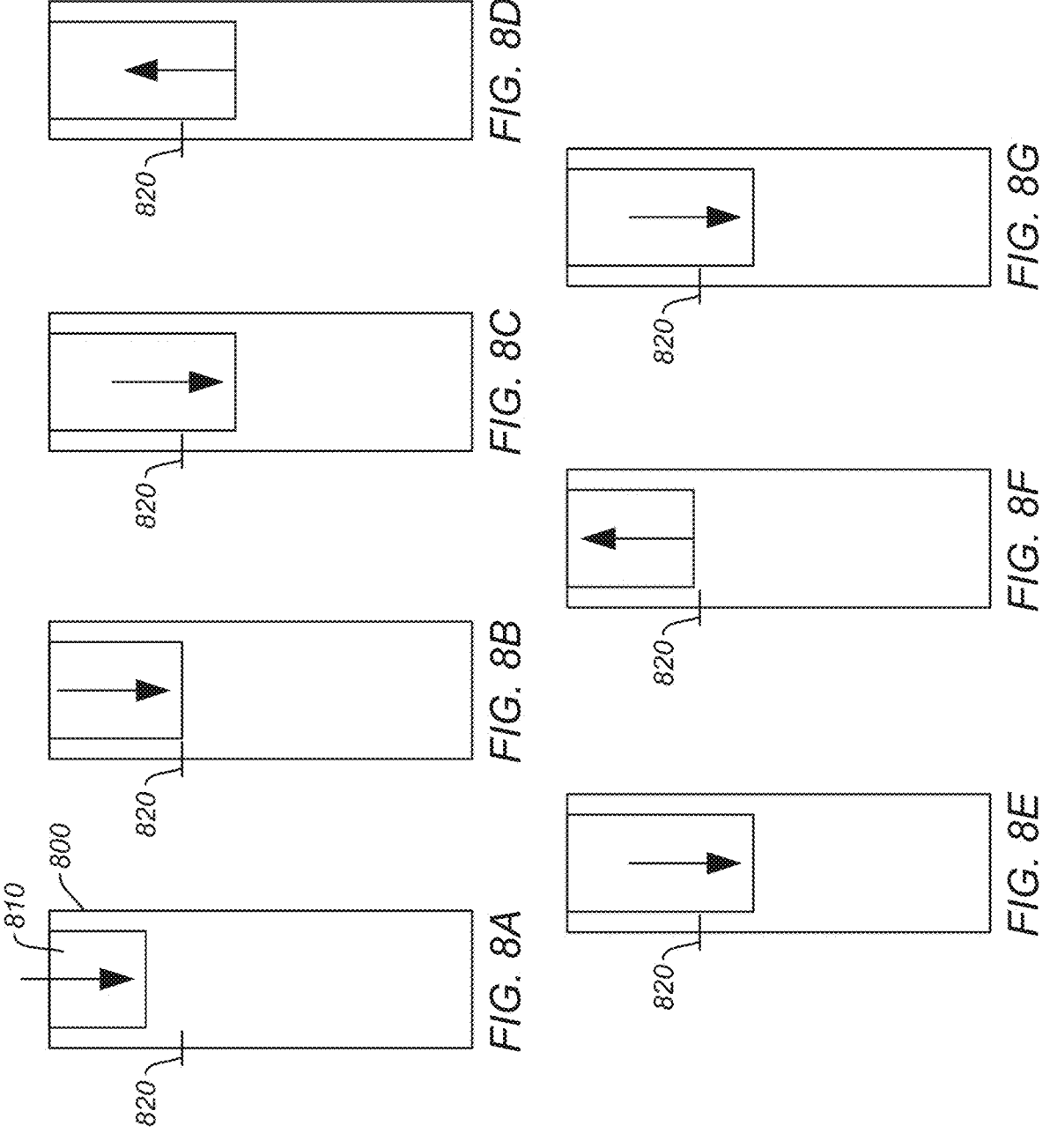
FIGS. 8A-8G illustrate aspects of a smart keyswitch structure that utilizes magnetic actuation for impact-based feedback effects to indicate make and break events for rapid trigger, according to certain embodiments.

FIGS. 8A-8G illustrate aspects of a smart keyswitch structure that utilizes magnetic actuation for impact-based feedback effects to indicate make and break events for rapid trigger, according to certain embodiments. FIGS. 8A-8G show a range of motion 800 for a plunger 810 of a smart key structure with a key press threshold 820 and rapid trigger functionality, according to certain embodiments. The key press threshold 820 acts as a fixed actuation point to help illustrate rapid trigger functionality. It should be understood that, in some embodiments, not only can one or more fixed thresholds be set, but some embodiments may employ an adjustable threshold level(s) that can be adjustable by FW, SW, user interaction, or a combination thereof, as described above, and with or without rapid trigger functionality. One of ordinary skill in the art with the benefit of this disclosure would appreciate the many combinations, variations, etc., that are possible using the novel concepts described herein and through the present disclosure. Referring back to FIG. 8A, plunger 810 is pushed down, but is still below the key press threshold 820. Thus, no key press event is effectuated and no magnetic, impact-based feedback is generated. In FIG. 8B, plunger 810 continues downward and reaches key press threshold 820. A key press event is instantiated (a "make" event) and an impact-based feedback effect is applied. In FIG. 8C, plunger 810 continues downward past key press threshold 820. No change in direction has occurred, no key press event is instantiated, and no impact-based feedback effect is applied. In FIG. 8D, the keycap coupled to plunger 810 is released, causing plunger 810 to begin moving upwards while still below the key press threshold 820. Immediately upon the change in the direction of plunger 810, a key release event is instantiated (a "break" event) and a contemporaneous impact-based feedback effect is applied. In FIG. 8E, the keycap coupled to plunger 810 is pressed again, causing plunger 810 to begin moving back downward while still below the key press threshold 820. Immediately upon the change in the direction of plunger 810, a key press event is again instantiated (a "make" event) and a contemporaneous impact-based feedback effect is applied. In FIG. 8F, the keycap coupled to plunger 810 is released again, causing plunger 810 to begin moving back upward while still below the key press threshold 820. Immediately upon the change in the direction of plunger 810, a key press event is again instantiated (a "break" event) and a contemporaneous impact-based feedback effect is applied. The plunger continues upwards past the key press threshold 820, as shown. In FIG. 8G, the plunger 810 is pressed again, causing plunger 810 to begin moving back downwards. A key press event is not immediately instantiated upon the change in plunger direction 810 until the plunger once again passes the key press threshold 820. FIGS. 8A-8G are provided to show how a rapid trigger function could be implemented using the smart keyswitches and magnetic, impact-based feedback systems described herein. One of ordinary skill in the art with the benefit of this disclosure would appreciate the many modifications, variations, and alternative embodiments thereof.

Although many of the embodiments described herein use a position of the plunger to determine when a key press event (e.g., make or break event) is made, it should be understood that any suitable detection system (e.g., optical, inductive, capacitive, etc.) and any suitable target (e.g., plunger, metal or ferrous material, sensor, etc.) can be used to implement the novel concepts (e.g., magnetic, impact-based feedback) can be employed, as would be appreciated by one of ordinary skill in the art with the benefit of this disclosure.

It should further be reiterated that magnetic, impact-based feedback described herein provides many technical advantages over contemporary haptic systems. For instance, impact-based feedback can occur at any suitable location along a target's (e.g., plunger, sensed element) range of motion. That is, there may be multiple locations (e.g., 2, 3, 4, or more) along the range of motion where impact-based feedback may be employed. In some cases, impact-based feedback may be applied for both make and break events, and at different points along the range of motion for downward vs. upward movements of the detected target (e.g., plunger). Typical systems may provide feedback at a single point (e.g., at a single key press threshold), and the feedback is typically vibrational (e.g., piezo element) and not impact based. The impact-based feedback (e.g., a projected mass hitting a fixed or semi-fixed object) can be significantly stronger than a vibration, which may mechanically translate through the key structure to the user better than vibrations. Further, the driving current (or voltage, energy, etc.) that energizes the conductive coil can change very quickly, thus allowing nearly instantaneous changes in the magnetic field (e.g., changes that occur in microseconds) allowing very precise control of the movement of the slug (e.g., magnet, ferrous material) within the cavity. Thus, the intensity of impact, the frequency of impact (e.g., for each make or break event beyond a threshold position over the range of motion), or type of impact (e.g., singular impacts, rapid impacts for a buzzing-type feedback, very strong to very weak impacts) in any suitable combination as would be appreciated by one of ordinary skill in the art with the benefit of this disclosure.

In some embodiments, the impact force and the speed that the slug is projected via the magnetic field can be tuned (e.g., adjust the current, duration of driving voltage, etc.) based on the distance that the slug has to travel to hit the plunger or portion of the housing. For instance, if three positions along a range of motion trigger an impact-based feedback, the system may adjust the current or duration of driving voltage for each position such that a same impact force is applied to the plunger. Thus, an increased deflection of the slug would be needed to traverse to a higher position along the range of motion than the lowest position. Some systems may factor in the downward force of gravity and utilize the magnetic field to reverse polarity and stop or mitigate debounce effects, as would be appreciated by one of ordinary skill in the art with the benefit of this disclosure. Any suitable voltage and/or current can be used to control the magnetic field. By way of non-limiting example, a typical voltage may be a USB voltage of 5V and 100 mA, though higher and lower values can be used.

In many of the embodiments described and depicted herein, a slug impacts a bottom of a plunger to generate a feedback effect. In some cases, the slug (or other suitable magnetic or ferrous material or element) can impact a portion of the housing or other feature other than the plunger. In some embodiments, the plunger may be hollow and include a channel or cavity inside where the slug may be projected up into the plunger and impact a portion of the plunger or other feature therein.

In certain embodiments, any suitable magnetic, impact-based feedback can be employed through precise control of the current (and/or voltage) applied to the conductive coil. In some cases, linear, tactile, and clicky feedback, like those provided in conventional mechanical switches, can be achieved. Linear feedback is typically quiet with little to no tactile feedback. A linear feedback can be achieved by using little to no impact. Tactile feedback conventionally have a small bump midway through a key press. A larger impact and adjustments thereof (e.g., amplitude of impact, duration and/or variation of the magnetic field) can be used to simulate a tactile feedback. Clicky feedback typically generates a louder sound and feels like a conventional mechanical keyboard. An even larger impact and corresponding adjustments can be used to achieve a clicky type feedback. One of ordinary skill in the art with the benefit of this disclosure would appreciate the many modifications, variations, and alternative embodiments thereof.

In certain embodiments described herein, magnetically induced feedback can be a sole contributor or a partial contributor of the totality of the haptic feedback afforded by the system. For example, in the case of a partial contributor, haptic feedback can be originated by any present mechanical elements in the system, such as springs, guides, stoppers, etc. The magnetically induced, impact-based haptic feedback can operate as a modifier of the feedback and is superimposed over the inherent mechanical feedback of the system, likely quasi-linear and within defined travel by end-stops.

In some embodiments, there may be a single threshold or multi-threshold, either of which may be fixed or set (e.g., via SW). In some cases, the threshold can be an adaptive threshold, which can correspond to rapid trigger configurations.

Figure 9:
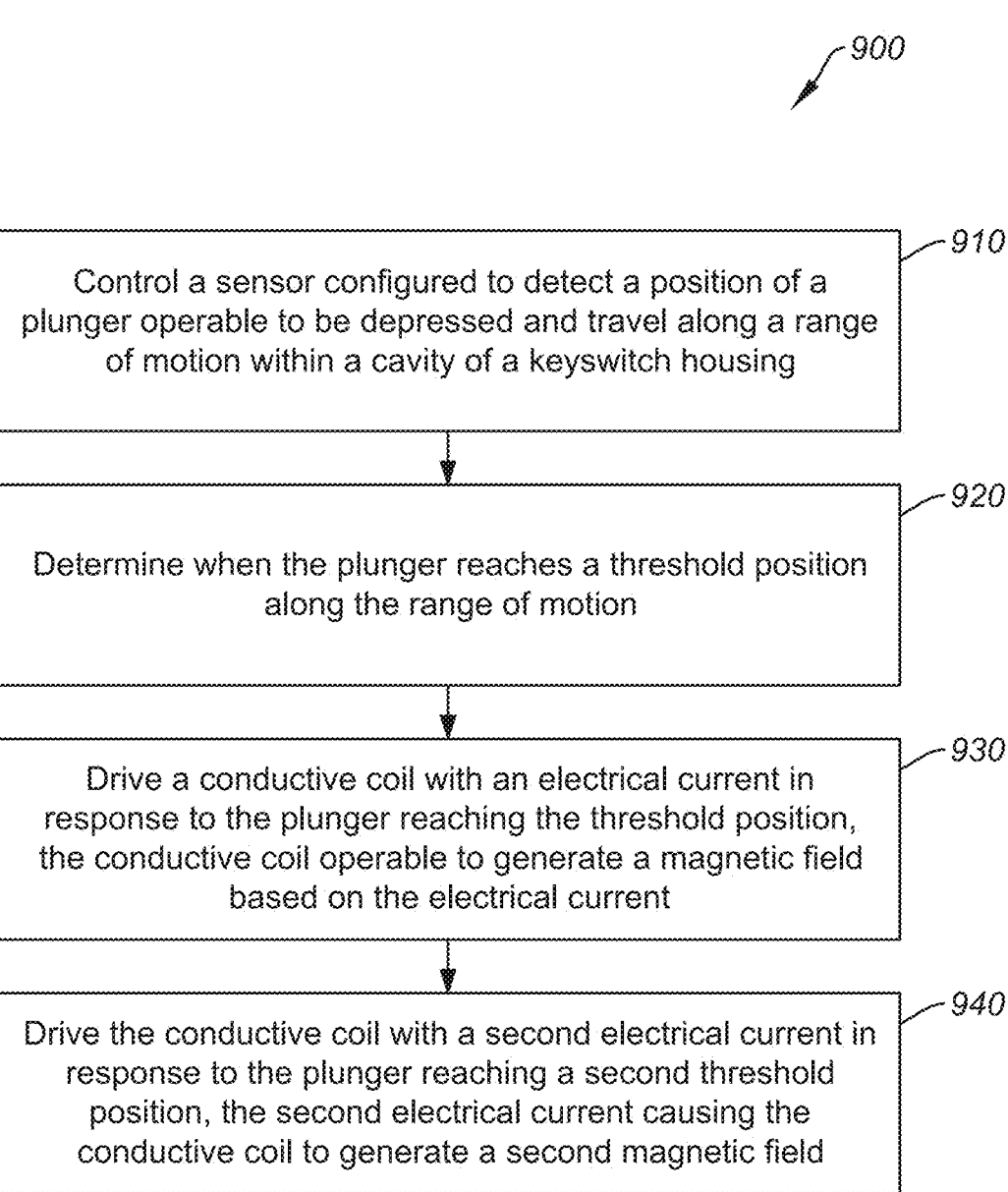
FIG. 9 is a simplified flow chart showing aspects of a method 900 for of operating a smart keyswitch, according to certain embodiments.

FIG. 9 is a simplified flow chart showing aspects of a method 900 for of operating a smart keyswitch, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by aspects of system 200 (processor(s) 210), system 300, or a combination thereof.

At operation 910, method 900 can include controlling a sensor configured to detect a position of a plunger operable to be depressed and travel along a range of motion within a cavity of a keyswitch housing, according to certain embodiments.

At operation 920, method 900 can include determining when the plunger reaches a threshold position along the range of motion, according to certain embodiments.

At operation 930, method 900 can include driving a conductive coil with an electrical current in response to the plunger reaching the threshold position, the conductive coil operable to generate a magnetic field based on the electrical current, according to certain embodiments. Driving the conductive coil can be where the magnetic field magnetically moves a magnetic element (e.g., slug) causing the magnetic element to impact a portion of the keyswitch housing or the plunger. The impact can cause an impact-based feedback effect that mechanically translates through the keyswitch. In some aspects, the generated magnetic field controls an acceleration and velocity of the deflection of the magnetic element, thereby affecting impact characteristics of the magnetic element against the portion of the housing or the plunger.

At operation 940, method 900 can include driving the conductive coil with a second electrical current in response to the plunger reaching a second threshold position, the second electrical current causing the conductive coil to generate a second magnetic field that moves the magnetic element causing the magnetic element to impact the portion of the keyswitch housing or the plunger, according to certain embodiments.

In some alternative embodiments, rather than driving a conductive coil in response to the plunger reaching fixed threshold position(s), the threshold may be dynamically adjusted based on sensing information (e.g., position, speed, acceleration), based on sensing information from neighboring keys, operate in a rapid trigger configuration, or the like, as would be appreciated by one or ordinary skill in the art with the benefit of the present disclosure.

In some implementations, the conductive coil can be integrated with a printed circuit board (PCB). The magnetic element and conductive coil may be configured outside of the keyswitch housing, inside of the keyswitch housing, or a combination thereof. In some embodiments, the conductive coil is integrated with a printed circuit board (PCB), the magnetic element is configured inside of the keyswitch housing, and the conductive coil are configured outside of the keyswitch housing. In some aspects, the conductive coil is integrated with a printed circuit board (PCB), the magnetic element and conductive coil are configured inside of the keyswitch housing. The conductive coil may also be integrated with the housing or other suitable substrate. In some cases, the keyswitch may operate on a keyboard, a computer mouse, multimedia controls, simulation controllers (e.g., throttle, shifter, paddle shifter, pedals, etc.), rotary knobs (e.g., by embedding the system in a cam-like device), etc., as would be appreciated by one of ordinary skill in the art with the benefit of this disclosure.

In some aspects, the various systems described herein can include any suitable use case, including but not limited to: (1) dynamically floating thresholds to enable rapid trigger, which can be controlled by SW and/or FW; (2) click experience (e.g., impact-based UX) can vary depending on contextuality of the user in games or other interactive activities; (3) additional layers of feedback beyond the click itself but still related to the input by the user can be implemented using such systems, such as haptic detents and progressive amplitude vibrations and impacts; (4) producing feedback not directly related with the user input but software driven, such as contextual feedback and notifications, acting as an active haptic driver; or (5) with an analogue sensing input, and by measuring velocity and acceleration, inducing the movement of the magnetic element before the switch reaches the clicking threshold, thus adaptively reducing system lag and enabling a faster input-feedback response, in an order of milliseconds. One of ordinary skill in the art with the benefit of this disclosure would appreciate the many modifications, variations, and alternative embodiments thereof.

It should be appreciated that the specific steps illustrated in FIG. 9 provide a particular method 900 for operating a smart keyswitch, according to certain embodiments. Other sequences of steps may also be performed according to alternative embodiments. Furthermore, additional steps may be added or removed depending on the particular application (e.g., operation 940 can be optional, more threshold positions and corresponding currents can be used, etc.). Any combination of changes can be used and one of ordinary skill in the art with the benefit of this disclosure would understand the many variations, modifications, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®).

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A keyswitch for a keyed device, the keyswitch comprising:

a housing with an inner structure defining a cavity within;

a plunger protruding from a top side of the housing and extending into the cavity, the plunger operable to be depressed and travel along a linear range of motion within the cavity of the housing;

a slug comprised of magnetic material and configured at a bottom section of the cavity; and a conductive coil, wherein the conductive coil is operable to generate a magnetic field in response to receiving an electrical current, the magnetic field operable to magnetically move the slug within the cavity causing the slug to impact a portion of the housing or the plunger, and wherein the impact causes a feedback effect that is mechanically transferred through the keyswitch.

2. The keyswitch of claim 1 further comprising a sensor configured to detect a position of the plunger along the range of motion, wherein the conductive coil receives the electrical current and generates the magnetic field based on the position of the plunger along the range of motion.

3. The keyswitch of claim 2 wherein the generated magnetic field controls an acceleration and velocity of the movement of the slug, thereby affecting impact characteristics of the slug against the portion of the housing or the plunger.

4. The keyswitch of claim 2 wherein the conductive coil generates the magnetic field and moves the slug when the plunger reaches a first threshold position along the range of motion, and wherein the conductive coil generates the magnetic field and moves the slug when the plunger reaches a second threshold position along the range of motion that is different than the first position.

5. The keyswitch of claim 1 wherein the conductive coil generates the magnetic field and moves the slug when the plunger reaches a first threshold position along the range of motion, wherein the first threshold position changes based on where the plunger is pressed and released along the range of motion.

6. The keyswitch of claim 1 wherein the conductive coil is integrated on one of a printed circuit board (PCB), a flexible substrate, the keyswitch housing via in-mold electronics integration, mechatronic integrated devices technologies, or multi-material additive manufacturing processes.

7. The keyswitch of claim 1 wherein the slug and conductive coil are configured outside of the housing.

8. The keyswitch of claim 1 wherein the slug is configured inside of the housing and the conductive coil is configured outside of the housing.

9. The keyswitch of claim 6 wherein the slug and conductive coil are configured inside of the housing.

10. The keyswitch of claim 1 wherein the keyed device is a keyboard.

11. The keyswitch of claim 1 wherein the keyed device is a computer mouse and the plunger is coupled to a keyplate.

12. The keyswitch of claim 1 wherein the impact causes an impact-based feedback effect that mechanically translates through the keyswitch to a top portion of the plunger.

13. A method of operating a keyswitch, the method comprising:

controlling a sensor configured to detect a position of a plunger operable to be depressed and travel along a range of motion within a cavity of a keyswitch housing;

determining when the plunger reaches a threshold position along the range of motion; and driving a conductive coil with an electrical current in response to the plunger reaching the threshold position, the conductive coil operable to generate a magnetic field based on the electrical current, wherein the magnetic field magnetically moves a magnetic element, causing the magnetic element to impact a portion of the keyswitch housing or the plunger, and wherein the impact causes a feedback effect that mechanically translates through the keyswitch.

14. The method of claim 13 wherein the generated magnetic field controls an acceleration and velocity of the movement of the magnetic element, thereby affecting impact characteristics of the magnetic element against the portion of the keyswitch housing or the plunger.

15. The method of claim 14 further comprising driving the conductive coil with a second electrical current in response to the plunger reaching a second threshold position, the second electrical current causing the conductive coil to generate a second magnetic field that moves the magnetic element causing the magnetic element to impact the portion of the keyswitch housing or the plunger.

16. The method of claim 13 wherein the magnetic element and conductive coil are configured outside of the keyswitch housing.

17. The method of claim 13 wherein the magnetic element is configured inside of the keyswitch housing, and wherein the conductive coil is configured outside of the keyswitch housing.

18. The method of claim 13 wherein the magnetic element and conductive coil are configured inside of the keyswitch housing.

19. The method of claim 13 wherein the keyswitch operates on a keyboard.

20. The method of claim 13 wherein the plunger is coupled to a user accessible keyplate of a computer mouse.

* * * * *